United States Patent Office 3,327,249
Patented June 20, 1967

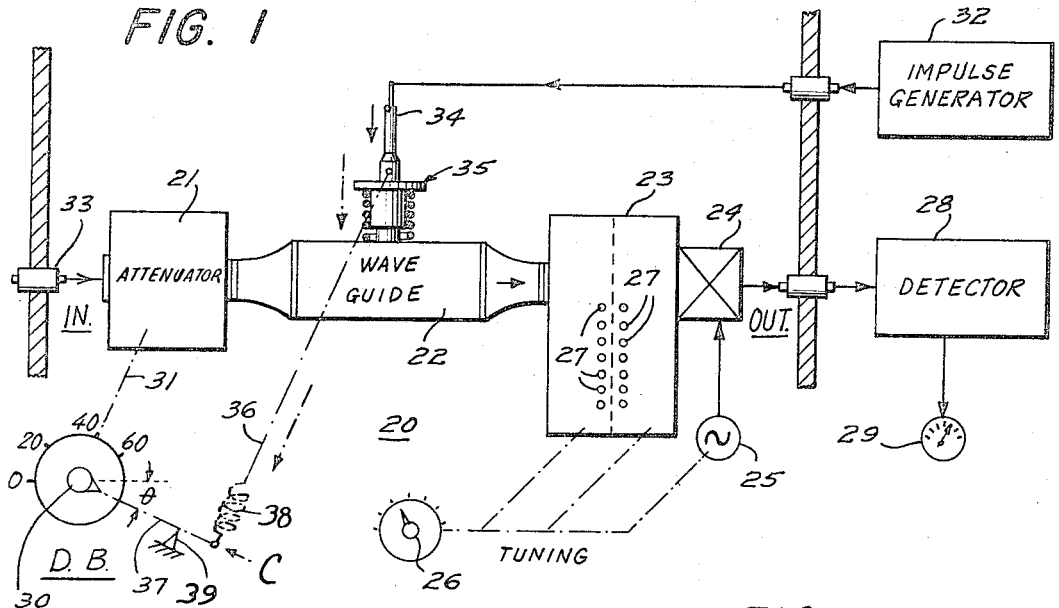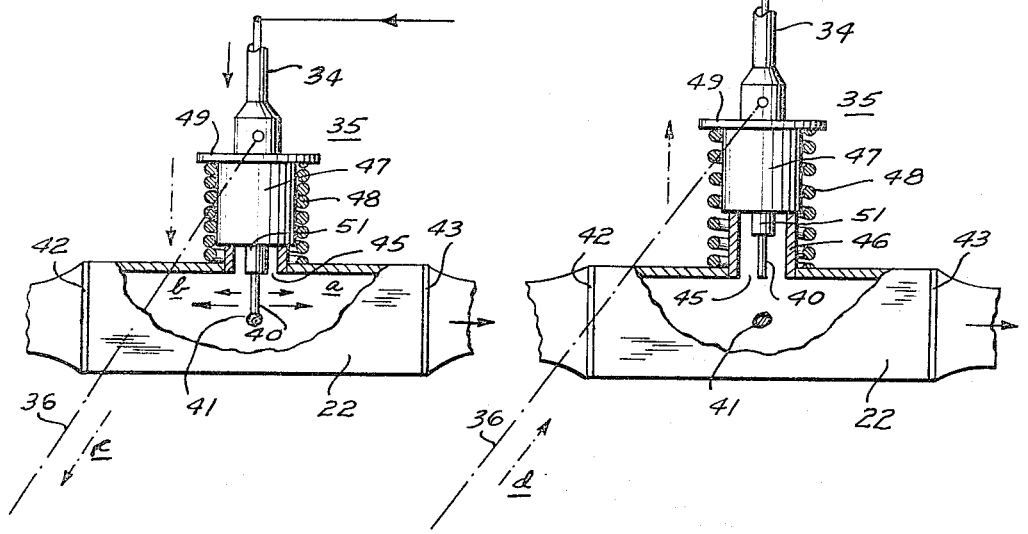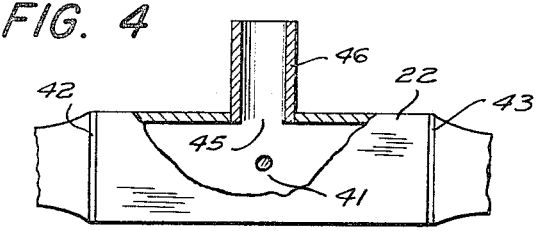

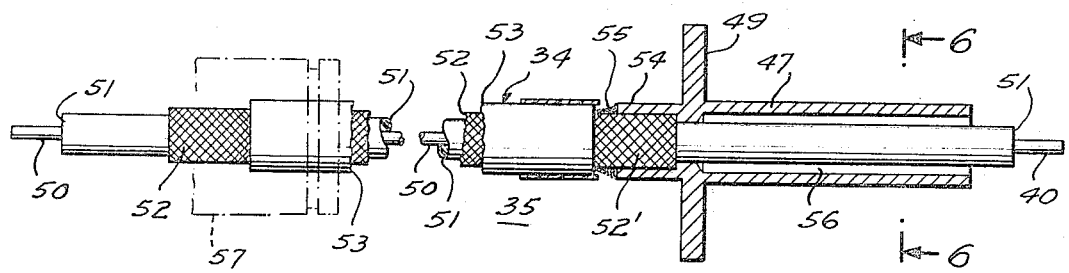

3,327,249
SELECTIVE IN-POSITION MICROWAVE SIGNAL
COUPLING MEANS
Serge Manfanovsky, Wayland, Mass., and Arling W. Ryberg, Southport, Conn., assignors to The Singer Company, New York, N.Y., a corporation of New Jersey
Filed Sept. 28, 1964, Ser. No. 399,489
8 Claims. (Cl. 333—6)

This invention relates to novel in-position coupling meanss for selective signal interaction with microwave apparatus, and more particularly to the simplification of the calibration of tunable microwave receivers with such means.

In accordance with the present invention signals in the microwave range, namely above the order of one kilomegacycle, are effectively coupled with a wave-guide circuit element through a retractable rod-like probe. The probe is extended interiorly of the wave-guide to either inject or extract signal energy. In the former mode it is used as a signal input coupling; in the latter as a signal monitoring or output coupling. The probe member is connected to exterior circuitry through a coaxial cable. Mechanically, the probe is extendible through an aperture in the wave-guide proportioned in the below-cut off range to prevent signal passage or leakage across its plane, as will be set forth. In its exemplary embodiment the probe is spring-biased to its normally inactive position, being mechanically actuated to its signal coupling position. It is simple in construction and operation, rapid and effective in action.

The invention coupling probe is useful to monitor or measure the signal content in any section of a microwave apparatus having the form of a wave-guide or equivalent. Its relatively small configuration introduces negligible signal loss or interference. The signal energy picked-up by the probe tip is transmitted externally of the wave-guide through the coaxial cable to suitable amplification or translation circuitry. When used to inject signals into a wave-guide or mixer section of an apparatus, such coupling may serve as a "switch" to selectively impress the signals, as for transmission or calibration purposes. When retracted, the probe means of the invention though constructed as part of the microwave apparatus, introduces no extraneous or deleterious interaction with normal performance.

The above and further advantages, objects and features of the present invention will become more apparent from the following description of exemplary embodiments thereof, illustrated in the accompanying drawings, in which:

FIG. 1 is a schematic diagram of the invention coupling probe used in the calibration of a microwave receiver.

FIGS. 2 and 3 are enlarged elevational views of the coupling probe of FIG. 1 in both of its operational positions.

FIG. 4 is an elevational view, partially cut away, of the wave-guide per se, of the coupling of FIGS. 2 and 3.

FIG. 5 is an enlarged longitudinal cross-sectional view through the exemplary coupling probe per se, of FIGS. 1–3.

FIG. 6 is a cross-sectional view taken along the line 6—6 of FIG. 5, transversely through the probe.

FIG. 7 is a schematic diagram of another microwave system incorporating the invention selective signal coupling means.

The microwave system of FIG. 1 contains a tuning unit 20 for a noise and field intensity receiver and/or meter, arranged for calibration in accordance with the present invention. A commercial noise and field intensity meter may contain several plug-in tuning units, each for a different tuning band. Such receiver/meter is illustrated in the copending U.S. patent application Ser. No. 96,118 filed on Mar. 16, 1961, for "Microwave Receiver Tracking Mechanism," now Patent No. 3,154,955, and assigned to the assignee hereof.

The reception frequency range of 1.0 to 15.0 kilomegacycles is covered through five plug-in tuning units, each containing individual radio frequency circuits. The fourth and fifth units, in practice, encompass the 7 to 10 kmc. and the 10 to 15 kmc. bands, respectively, each with a 1 to 1.5 tuning ratio. At such high frequencies, particularly for the 10 to 15 kmc. band, a wave-guide 22 is used to couple the input attenuator 21 with RF preselector 23. Tuning units for below 7 kmc. generally have their attenuator 21 coupled directly with the preselector.

The remainder of tuning unit 20 contains a crystal mixer 24, and a klystron oscillator 25. The preselector 23 has two coupled cavities, and is tuned over its band in unison with the oscillator 25 through the tuning linkage and knob 26. The preselector cavities are adjusted and tracked by threaded slugs 27. A typical intermediate frequency output from mixer 24 is 348 megacycles. An amplifier-detector 28 provides suitable readings at output meter 29. In normal operation, the signal input to tuner 20 is adjusted through attenuator 21, operated by knob 30 via linkage 31. Attenuation in 20 db steps, up to 60 db, is provided by unit 21.

A well-known calibrating instrument for microwave tuning units is an impulse generator. Such impulse generator 32 serves as an accurate calibrator of the tuning units 20. Device 32 produces extremely short pulses whose spectrum is uniformly distributed over the frequency range. Such pulses may be produced by discharging a short length of charged coaxial line into a load impedance, through a mechanically vibrating contact, such as shown in Patent No. 2,932,802 issued on Apr. 12, 1960, for "Coaxial Line Type Impulse Generator."

In the procedure herein, for calibrating the higher kilomegacycle tuners 20, the signals from impulse generator 32 are introduced directly into the wave-guide 22 through the coupling probe 35 of the invention hereof. A flexible coaxial cable 34 connects generator 32 with the tip end of probe 35 actuated to its position within wave-guide 22, to be set forth in detail hereinafter. The probe 35 is set in its signal coupling or injection position through a mechanical linkage. In the exemplary system, a linkage 36, 37, 38 is connected with attenuator knob 30 in a manner to actuate probe 35 to its coupling or injection position when the knob is moved to the calibration setting C. A spring 38 is included in the linkage arrangement, as schematically indicated in FIG. 1. The link 36 connects the displaceable portion of probe 35 with spring 38; and link 37, connects knob 30 with the spring.

The advantage of actuating the probe 35 by the attenuator knob 30 is that a predetermined substantial attenuation is automatically set-up through attenuator unit 21 for the duration of the calibration operation. Reflections of the signals introduced are thereby attenuated during the calibration, as will be described. When it is desired to frequency calibrate the tunable system 20, the attenuator knob is turned to the end position, wherein link 37 abuts stop 39 at the calibration setting C. The attenuator 21 is arranged to be at or near its maximum attenuation position when the knob is at the C setting. In FIG. 1 the C setting is shown at an angle $\theta$ beyond the normal scale range of the knob. A shaped lossy card attenuator in unit 21 is thereby readily positioned to a high attenuation angle for the calibration C procedure. Alternatively, the attenuator 21 and its knob 30 may be constructed independently of a probe linkage 36, 37, 38 and in turn be separately adjusted for the calibration mode.

The tuning knob 26 is turned to a selected frequency reading on its associated scale, correspondingly setting the preselector 23 and oscillator 25. The impulse generator 32 is thereupon adjusted to give a predetermined "standard" wide-band signal output, as 100 millivolts, that is directly impressed upon probe 35. The output level of tuner 20 is read on meter 29, being the calibration for the tuned frequency setting per knob 26. The calibration proceeds for similar steps along the frequency dial 26, using the same 100 millivolt level input of the impulses from unit 32, with the recording of the corresponding readings of meter 29.

The signal injection into the wave-guide 22 of the tuner 20 by probe 35 is illustrated more clearly in FIG. 2. Its central rod-tip 40 is projected half-way into guide 22 to contact a cross-bar 41 mounted thereat. The spring indicated at 38 in the linkage 36, 37 facilitates smooth contacting of the probe tip 40 with the cross-bar 41. Tip 40 acts as a pole antenna radiator, radiating towards the preselector 23 in the direction $a$, as well as backwardly towards the attenuator 21, in the $b$ direction. The ends of cross-bar 41 are supported centrally of the wave-guide 22, at the mid-points of the opposed sides thereof, to effect a cross-bar transition coupling therein. The signal energy in the $b$ direction passes through the attenuator 21 preset, automatically herein, to its maximum 60 db position at the calibration setting C, as hereinabove set forth. The $b$ signals are thus materially attenuated as they pass through the unit 21.

Should some signal content still remain and be reflected from the input terminal 33 region, its passage again through the attenuator 21 would eliminate introduction of reflections or VSWR problems due to the insertion of probe tip 40. Further, with the attenuator 21 at its maximum absorption setting during calibration, a possible spurious or inadvertent signal at input terminal 33 is rendered ineffective in disturbing the results. If there were no attenuation provided equivalent to the system hereof, signal reflections would occur and poor VSWR would result upon introduction of the calibration signal. Automatic insertion of the attenuation when the calibration is set, at C, renders the results foolproof, as the spurious signal actions would otherwise occur without being noticed. Alternatively, one may actuate the attenuator 21 to its maximum setting independently of the probe 35 insertion.

The central rod 40 of probe 35 enters the wave-guide 22 through an aperture 45 thereof at which a tube 46 is suitably secured, extending externally, see FIGS. 2–4. The body of the probe is a sleeve 47 slidable over tube 46. A helical spring 48 surrounds sleeve 47 and abuts a transverse disc 49 secured with the sleeve. In this manner the probe tip 40 is normally biased outwardly of the wave-guide. For signal injection the probe 35 is pressed against spring 48 as through mechanical means indicated at 36 and $c$ in FIG. 2. Upon release of the actuation $d$, the spring 48 raises probe 35, and its tip 40 is moved out of the interior of wave-guide 22, see FIG. 3.

As mentioned hereinabove, the aperture 45 through which the probe 35 is coupled with the wave-guide 22 is proportioned below cut-off for the frequency band of the tuner 20. In the exemplary 10 to 15 kmc. tuner, the diameter of opening 45 is made equal to or less than one-third of the wavelength of its mean frequency of 12.5 kmc. Thus no signal energy in the tuner's range will effectively cross through the opening 45, and the tip 40 when retracted is out of coupling relation with the wave-guide. The dimensions of the corresponding exemplary wave-guide 22 are 0.750" wide by 0.375" high; the traverse of tip 40 with respect to cross-bar 41 being 0.155". In essence, when probe 35 is retracted, no leakage of the microwave energy passing through wave-guide 22 during normal operation occurs through opening 45.

The physical construction of probe 35 is detailed in FIGS. 5 and 6. The tip 40 is an extension of the central solid conductor 50 of the flexible coaxial cable 34. Cable 34 is composed of conductor 50, encased by tubular dielectric 51 of low-loss material as "Teflon," in turn surrounded by metal braid 52 and a suitable closely fitted jacket 53. The neck 54 of the probe structure contacts the braid end 52', and soft solder bonding 55 secures them together. Probe sleeve 47, disc 49 and neck 54 are integrally fabricated of metal. A tubular space 56 is provided to fit probe 35 onto the coupling tube 46 extending from the wave-guide, see FIGS. 2–4. A fitting indicated at 57 may be secured adjacent the free end of cable 34 for attachment.

FIG. 7 is a schematic representation of a microwave system utilizing the coupling probe means of the invention in different modes. A first or main transmitter unit 60 normally feeds into wave-guide 61 and on to amplifier 62. A further wave-guide 63 couples amplifier 62 to antenna 64 to radiate the microwave signals. A probe 65 is mounted with wave-guide 63 either for sampling the microwave power passing therethrough or for continuously monitoring it. Probe 65 is mounted on a tube 66 projecting from guide 63, and biased into normal "out" position by spring 67. A lever 68 is actuated in direction $e$ to insert the probe tip 70 into the wave-guide 63 along its $f$ direction. Signal energy is picked-up by tip 70 and conducted by coaxial cable 71 to metering instrument 72.

A second probe 75 is similarly connected with the other wave-guide 61, through a mounting tube 76 and spring 77. When lever 78 is moved in the $g$ direction the probe tip 80 enters the guide in the $h$ direction. The probe 75 may be used to sample or monitor microwave energy fed into wave-guide 61, or may be used to inject signal therein. Unit 81 may be a second transmitter arranged to feed into wave-guide 61 through tip 80 when inserted therein. Flexibility of application of the invention selective in-position coupling probe in microwave circuitry and equipment will now be apparent to those skilled in the art. When used for temporary signal insertions or sampling the invention probe may be considered as a coupling "switch."

Although the present invention has been described in specific embodiment and application, it is to be understood that variation and modification thereof may be made within the broader spirit and scope of the invention, as set forth in the following claims.

What is claimed is:

1. Microwave apparatus comprising a tunable section, a wave-guide in circuit with said section, a selectively positionable probe for signal coupling with the wave-guide, an attenuator operatively connected with said wave-guide, and mechanism for positioning said probe into signal coupling relation with the wave-guide interior and simultaneously setting said attenuator into a substantial signal absorption position.

2. Microwave apparatus comprising a section tunable over a given frequency band in the kilomegacycle range, a wave-guide coupled to said section and proportioned for the passage of signals in said band, a selectively positionable probe for signal coupling with the wave-guide interior, an attenuator operatively connected with said wave-guide, and mechanism for positioning said probe into signal coupling relation with the wave-guide and simultaneously setting said attenuator into a substantial signal absorption position.

3. Microwave apparatus comprising a section tunable over a given frequency band, a wave-guide with one end coupled to the input of said section and proportioned for the passage of signals in said band, a selectively positionable probe for signal coupling with the wave-guide interior, an attenuator operatively connected with the other end of said wave-guide, and mechanism for jointly positioning said probe into signal coupling relation with the wave-guide and said attenuator at a substantial signal absorption setting for inhibiting signal reflections due to signal injection by the probe into the wave-guide.

4. Microwave apparatus as claimed in claim 3, further including a tube extending from an aperture in the wave-guide structure and proportioned for engaging said probe and guiding its coupling portion through the aperture for electrical coupling with the wave-guide interior, the aperture being dimensioned to be below cut-off substantially for the frequency band of the wave-guide to inhibit signal coupling between the wave-guide and the probe when retracted.

5. Microwave apparatus as claimed in claim 1, in which said wave-guide contains a transition coupling member in the path of said probe, whereby said probe contacts said member when positioned for signal coupling within said wave-guide.

6. Microwave apparatus as claimed in claim 3, in which said wave-guide contains a transition coupling member in the path of said probe, whereby said probe contacts said member when positioned for signal coupling within said wave-guide.

7. Microwave apparatus as claimed in claim 2, in which said wave-guide contains a transition coupling cross-bar in the path of said probe, whereby the tip of said probe contacts said cross-bar when positioned for signal coupling within said wave-guide.

8. Microwave apparatus as claimed in claim 4, in which said wave-guide contains a transition coupling cross-bar in the path of said probe, whereby the tip of said probe contacts said cross-bar when positioned for signal coupling within said wave-guide.

References Cited

UNITED STATES PATENTS

| | | | |
|---|---|---|---|
| 2,477,347 | 7/1949 | Posey | 33—98 X |
| 2,551,398 | 5/1951 | Sensiper | 333—98 X |
| 2,873,430 | 2/1959 | Tomiyasu | 333—98 X |
| 3,110,002 | 11/1963 | Bleackely | 333—98 |

OTHER REFERENCES

"Experimental Microwaves," by A. W. Cross, Stevenage, England W. H. Sanders (Electronics) Ltd. Library date Mar. 3, 1962, pp. 46–47 and 152.

ELI LIEBERMAN, *Primary Examiner.*

M. NUSSBAUM, *Assistant Examiner.*